United States Patent Office 3,221,033
Patented Nov. 30, 1965

3,221,033
NOVEL PROCESS FOR THE PREPARATION OF
1,5-BIS-DEHYDRO STEROIDS
Elliot L. Shapiro, Cedar Grove, N.J., assignor to Schering Corporation, Bloomfield, N.J., a corporation of New Jersey
No Drawing. Filed July 7, 1964, Ser. No. 380,907
4 Claims. (Cl. 260—397.4)

This application is a continuation-in-part of applicant's copending application Serial No. 312,273, filed September 30, 1963, now abandoned.

This application relates to a novel process for effecting a partial deconjugation of a cross-conjugated system in steroids. More particularly, this application relates to a process for converting a 3-keto-$\Delta^{1,4}$- steroid to a 3-keto-$\Delta^{1,5}$- steroid.

Specifically, by my process, a steroid having a 3-keto-$\Delta^{1,4}$-cross-conjugated system is subjected to the action of an alkali metal alkoxide, such as potassium tertiary-butoxide and sodium ethoxide in a solvent selected from the group consisting of a lower dialkyl sulfoxide, e.g., dimethylsulfoxide and diethylsulfoxide, and a lower dialkyl alkanoic acid amide, e.g., dimethylformamide, diethylformamide, and dimethylacetamide.

My process is most advantageously carried out utilizing potassium tertiary-butoxide as the deconjugation agent and dimethylsulfoxide as solvent.

In a preferred mode of my invention, a 3-keto-1,4-androstadiene, e.g., 17α-methyl-1,4-androstadiene-17β-ol-3-one, is allowed to react with potassium tertiary-butoxide in dimethylsulfoxide at room temperature for a short period of time, i.e., from about 15 to 30 minutes. Isolation of the resulting 3-keto-1,5-dehydro-steroid, e.g., 17α-methyl-1,5-androstadiene-17β-ol-3-one may be effected by diluting the reaction mixture with ice water, for example, and either filtering the resultant precipitate or, preferentially, by extracting the diluted aqueous reaction mixture with an inert organic solvent such as methylene chloride, chloroform, or ethyl acetate. Purification of the isolated 3-keto-$\Delta^{1,5}$- steroid is effected by crystallization or by chromatographic techniques well known in the art.

In my process, the choice of solvent is critical, it being necessary to use either a di-alkylsulfoxide or a di-lower alkyl alkanoic acid amide as solvent in order to effect deconjugation of a 3-keto-$\Delta^{1,4}$- system by means of an alkali metal alkoxide. For example, when 17α-methyl-1,4-androstadiene-17β-ol-3-one is reacted with potassium tertiary-butoxide in dimethylsulfoxide according to my process, the corresponding $\Delta^{1,5}$- steroid, i.e., 17α-methyl-1,5-androstadiene-17β-ol-3-one is isolated in good yield, i.e., from about 40-70% the theoretical yield; whereas, when solvents such as tertiary-butanol, benzene, and diglyme (diethylene glycol dimethyl ether) are used, deconjugation does not occur.

In my process, when the starting steroid has a cortical side chain such as in prednisone, it is preferable to protect the side chain at C-17 prior to reaction with the alkali metal alkoxide in order to minimize possible competing reactions, such as the rearrangement of the side chain to form a D-homo steroid, or reaction of the free hydroxy functions with the alkali metal alkoxide to form the corresponding alkali metal salt. Typical derivatives suitable for protecting the cortical side chain are the 17,20;20,21-bis-methylenedioxy function and the 17,21-acetonide derivative, which are prepared by procedures well known in the art. Thus, prednisone may be converted to either the corresponding 17,20;20,21-bis-methylenedioxy- or 17,21-acetonide-derivative, and when each are reacted with potassium tertiary-butoxide, for example, there is obtained the corresponding 3-keto-$\Delta^{1,5}$- derivative, namely, 17,20;20,21-bis-methylenedioxy-1,5-pregnadiene-3,11-dione or 1,5-pregnadiene-17α,21-diol-3,11,20-trione 17,21-acetonide, respectively. Mild acid hydrolysis of each of the foregoing derivatives yields 1,5-pregnadiene-17α,21-diol-3,11,20-trione.

In 1,4-pregnadienes not having a cortical side chain but having a 17α-hydroxy function, such as 17α-hydroxy-1-dehydroprogesterone, preparation of a 20-ketal derivative, e.g., the 20-ethylene ketal, according to known procedures is desirable prior to reaction with the alkali metal alkoxide in dialkylsulfoxide or a dialkyl alkanoic acid amide, e.g., potassium tertiary-butoxide in dimethylsulfoxide. Thus, 17α-hydroxy-1-dehydroprogesterone is reacted with ethylene glycol and the resulting 17α-hydroxy-20-ethylenedioxy-1-dehydroprogesterone subjected to the action of potassium tertiary-butoxide in dimethylsulfoxide according to my process whereby one obtains 17α - hydroxy - 20 - ethylenedioxy - 1,5 - pregnadiene - 3-one. Cleavage of the 20-ketal is effected in a weak acid medium according to known techniques to obtain the free 20-keto compound, 17α-hydroxy-1,5-pregnadiene-3,20-dione.

In those 1,5-pregnadienes devoid of a 17α-hydroxy function, e.g., 1-dehydroprogesterone, protection of the 20-ketone prior to reaction with potassium tertiary-butoxide, for example, is not necessary.

The starting compounds for my process may be any steroid having a 3-keto-$\Delta^{1,4}$- system in the A ring, with those having either a 17α-hydroxy-17β-acetyl or a cortical side chain at C-17 being preferably protected as described hereinabove. Thus, suitable starting steroids include 3-keto-1,4-pregnadienes, such as prednisone (1,4-pregnadiene - 17α,21 - diol - 3,11,20 - trione), prednisolone (1,4 - pregnadiene - 11β,17α,21 - triol - 3,20 - dione), dexamethasone (9α-fluoro-16α-methyl-1,4-pregnadiene - 11β,17α,21 - triol - 3,20 - dione), 6α-methyl - 1,4-pregnadiene - 11β,17α,21 - triol - 3,20 - dione, 6α - fluoro-1,4 - pregnadiene - 11β,17α,21 - triol - 3,20 - dione, 1 - dehydroprogesterone (1,4-pregnadiene-3,20-dione), 17α-hydroxy - 1 - dehydroprogesterone (1,4 - pregnadiene-17α-ol-3,20-dione), and 3-keto-1,4-androstadienes, such as, 1-dehydro-testosterone (1,4-androstadiene-17β-ol-3-one) and 17α-methyl-1,4-androstadiene-17β-ol-3-one. The 3-keto-$\Delta^{1,4}$- steroidal starting compounds of my process need not necessarily be a member of the pregnane or androstane series, it being only necessary that the starting compounds possess a 3-keto-$\Delta^{1,4}$- steroid and that any reactive groups be preferentially protected as described hereinabove.

It is thus apparent from the foregoing, that the 3-keto-$\Delta^{1,4}$- starting compounds of my novel process may be substituted at one or more carbons on the steroid nucleus, particularly at positions 2, 4, 6, 9, 11, and 16, which substituents are introduced by methods well known in the art.

In my process we usually use an excess of alkali metal alkoxide, e.g., potassium tertiary-butoxide, sodium ethoxide, sodium methoxide, with respect to the molar quantity of the 3-keto-$\Delta^{1,4}$-starting steroid. In general, there should be present for each mole of starting 3-keto-$\Delta^{1,4}$-steroid at least an equimolar quantity of alkali metal alkoxide plus an added molar quantity for each hydroxyl group or ester thereof that may be present; although even larger molar excesses of basic agent may be used. Thus, when converting 17α-methyl-1,4-androstadiene-17β-ol-3-one to the corresponding 1,5-diene by my process there should be present at least two moles of the alkali metal alkoxide, e.g., potassium tertiary-butoxide for each mole of steroid.

My process may be effected from temperatures ranging from about 0° C. to about 40° C. and preferably in the range of about 5° C. to 35° C. and usually at about room temperature. In general, the solvent used in my process should, therefore, have a melting point lower than about 40° C.

In my novel process the conversion of a 3-keto-$\Delta^{1,4}$-steroid to a 3-keto-$\Delta^{1,5}$-steroid takes place within a relatively short time and, in general, within a half hour.

Under the conditions of my process, an ester group present in the starting steroid may remain unchanged depending upon the reaction time employed, the less hindered becoming hydrolyzed sooner than the more hindered esters. By regulating the reaction time in our process, one can regulate the degree of saponification and thereby the amount of ester remaining in the product. For example, 17α-methyl-1,4-androstadiene-17β-ol-3-one 17-acetate may be subjected to potassium tertiary-butoxide in dimethylsulfoxide at room temperature for three hours and be transformed principally to 17α-methyl-1,5-androstadiene-17β-ol-one. If the reaction is terminated in 15 minutes, a substantial amount of the 3-keto-1,5-diene 17-acetate may be obtained.

My process whereby a 3-keto-$\Delta^{1,4}$-steroid is converted to a 3-keto-$\Delta^{1,5}$-steroid is preferentially, although not necessarily, carried out under an inert atmosphere, such as, argon or nitrogen. For example, when the starting steroid contains a halogen substituent, e.g., 6α-fluoroprednisolone, optimum yields of the corresponding 1,5-dieneone, 6-fluoro-1,5-pregnadiene-11β,17α,21-triol-3,20-dione are obtained when my process is carried out under an inert atmosphere.

In my process, after reaction of a 3-keto-$\Delta^{1,4}$-steroid with potassium tertiary-butoxide in dimethylsulfoxide, for example, the desired 3-keto-$\Delta^{1,5}$-steroid is isolated by first adding the reaction mixture to a protic reagent, i.e., a proton donor medium such as water, an alcohol, or an acid, followed by extraction of the 3-keto-$\Delta^{1,5}$-steroid with a suitable organic solvent. Water is most generally used as the protic agent, either alone or together with an alcohol such as methanol or ethanol, or together with a suitable acid, e.g., lower alkyl fatty acid, such as acetic acid, or with other weak acids such as boric acid and phenol. For optimum yields, it is important that after addition of the reaction mixture to the protic reagent, the resultant protic medium be suitably buffered to a pH near neutrality, and/or the 3-keto-1,5-bis-dehydro product be immediately extracted from the protic medium. Thus, for example, after reacting 17α-methyl-1,4-androstadiene-17β-ol-3-one with potassium tertiary-butoxide in dimethylsulfoxide according to my process, and addition of the reaction mixture to ice water (as the protic reagent), best results are obtained when the 1,5-bis-dehydro steroid, 17α-methyl-1,5-androstadiene-17β-ol-3-one is immediately extracted with an organic solvent and the extracts washed to neutrality.

By my process there may be prepared therapeutically valuable 3-keto-1,5-pregnadienes such as the following described in U.S. Patent No. 2,908,696.

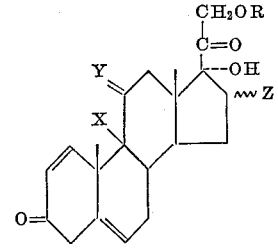

wherein X is hydrogen or a halogen having an atomic weight less than 126; Y may be keto or H,βOH; Z may be hydrogen, or an alkyl radical having up to 8 carbon atoms; and R is hydrogen or lower alkanoyl.

These above 3-keto-1,5-pregnadienes were previously prepared by a two-step process wherein there is first prepared a 6-substituted intermediate (e.g., a 6-bromo or 6-alkanoyloxy steroid) which is then further reacted with zinc in a lower fatty alcohol, for example. These 3-keto-1,5-pregnadienes may now be prepared by my process which eliminates the necessity of preparing an intermediary 6-substituted steroid, many of which are difficult to prepare.

My process is of particular value in preparing 3-keto-1,5-androstadienes, such as the orally effective anabolic agents, 17α-methyl-1,5-androstadiene-17β-ol-3-one and esters thereof described in the co-pending application of Shapiro and Oliveto, Serial No. 251,747, filed January 16, 1963, now U.S. Patent No. 3,127,430.

The 3-keto-1,5-androstadienes and 3-keto-1,5-pregnadienes prepared from the corresponding -$\Delta^{1,4}$-steroids by my process are also valuable as intermediates in preparing the corresponding 3(α and β)-hydroxy-$\Delta^{1,5}$-steroids, a new class of compounds described in the application of Tanabe and Oliveto, Serial No. 263,441, filed March 7, 1963. These 3-hydroxy-1,5-dienes, in general, exhibit enhanced activity over their respective 3-keto precursor. Many of the 3-hydroxy-1,5-diene transformation products are themselves useful intermediates, such as in the preparation of 6-substituted analogs, e.g., 6-fluoro, methyl, and the like.

Thus, a 3-keto-1,5-diene, e.g., 17α-methyl-1,5-androstadiene-17β-ol-3-one, upon reduction by means of an alkali metal aluminum or borohydride (lithium aluminum hydride, sodium borohydride, etc.), or a metal alkoxide (e.g., aluminum isopropoxide) or aluminum tertiary-butylate is converted to the corresponding 3-hydroxy-1,5-diene, e.g., 17α-methyl-1,5-androstadiene-3(α and β),17β-diol, separable via fractional crystallization and chromatographic techniques into the 3α- and 3β-hydroxy isomers, 17α-methyl-1,5-androstadiene-3α,17β-diol and 17α-methyl-1,5-androstadiene-3β,17β-diol, respectively, both of which are valuable as anabolic agents.

Prior to reduction of a 3-keto-1,5-diene to a 3-hydroxy-1,5-diene by the above-described process, any ketones present at C–17 or C–20, in the case of pregnadienes, should preferably be protected by a group such as an ethylene ketal or bis-methylenedioxy derivative. Thus, for example, the 17,20;20,21-bis-methylenedioxy derivative of 1,5-pregnadiene-11β,17α,21-triol-3,20-dione is reduced with sodium borohydride in water to the 17,20;20,21-bis-methylenedioxy derivative of 1.5-pregnadiene-3(α and β),11β,17α,21-tetrol-20-one, which upon mild acid hydrolysis will yield 1,5-pregnadiene-3(α and β),11β,17α,21-tetrol-20-one, separable to the 3α- and 3β-hydroxy isomers via chromatographic techniques, both of which are valuable as anti-inflammatory agents.

In the conversion of a 3-hydroxyl-1,5-diene to a 3-keto-6-substituted-1,4-diene, the transformation is effected utilizing known techniques. After protection of any ketone present at C–17 or C–20, epoxidation of the -$\Delta^5$- bond by means of a per-acid followed by treatment of the resulting 5α,6α-epoxy with hydrofluoric acid or a Grignard reagent such as methyl magnesium iodide yields the corresponding 5α-hydroxy-6β-fluoro- or 5α-hydroxy-6β-methyl-Δ¹-3β-ol intermediate, respectively. Chromic acid oxidation of the 3β-hydroxy to a 3-keto group followed by dehydration of the 5α-hydroxy function with a reagent such as thionyl chloride in pyridine will yield the corresponding 3-keto-6β-fluoro- and 3-keto-6β-methyl-1,4-dienes, respectively. Epimerization to the 6α-isomers may be effected with a base such as potassium tertiary-butoxide in tertiary-butanol to obtain the 3-keto-6α-fluoro- and 3-keto-6α-methyl-1,4-dienes, respectively.

Compounds of the following general formula which may be prepared from the corresponding 3-keto-1,4-dienes by my novel process are illustrative of the 3-keto-1,5-dienes useful as intermediates in the production of the corresponding 3-hydroxy-1,5-dienes:

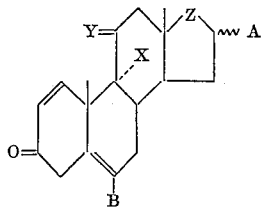

wherein A represents hydrogen, lower alkyl, α-hydroxy, and α-lower alkanoyloxy; B represents hydrogen, methyl, and fluoro; Y represents keto, (H,βOH), (H,αOH), and (H,β-halogen); X represents hydrogen and halogen, and when Y is (H,αOH), X is hydrogen, and when Y is (H,β-halogen), X is halogen; and X and Y together represent an epoxy or a 9(11)-bond; and Z is a member of the group consisting of

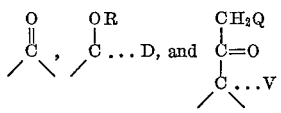

R being a member of the group consisting of hydrogen or lower alkanoyl; D being a member of the group consisting of hydrogen, lower alkyl, ethinyl, halogenoethinyl, or alkyl ethinyl; V being a member of the group consisting of hydrogen, hydroxy, and lower alkanoyloxy; and Q is a member of the group consisting of hydrogen, hydroxy, acyloxy, halogen, or lower alkyl.

The following are examples to illustrate the novel process of this invention, but are not to be construed as limiting, the scope of my invention being limited only by the appended claims.

*Example 1.—17α-methyl-1,5-androstadiene-17β-ol-3-one*

Dissolve 1 g. of 17α-methyl-1,4-androstadiene-17β-ol-3-one in 15 ml. of dimethylsulfoxide and cool the solution. Add 0.5 g. of solid potassium tertiary-butoxide. Stir the reaction mixture for approximately 30 minutes allowing the solution to warm to room temperature; then pour the mixture slowly into ice water. Extract the aqueous mixture with methylene chloride; then wash the combined methylene chloride extracts with water and evaporate to a residue comprising 17α-methyl-1,5-androstadiene-17β-ol-3-one. Purify by crystallization from acetone-hexane. M.P. 194–198° C.

In the above procedure, dimethylformamide may be used as solvent in place of dimethylsulfoxide to obtain 17α-methyl-1,5-androstadiene-17β-ol-3-one.

*Example 2.—17α-methyl-1,5-androstadiene-17β-ol-3-one 17-acetate*

A. *17α-methyl-1,4-androstadiene-17β-ol-3-one 17-acetate.*—Dissolve 17α - methyl-1,4-androstadiene-17β-ol-3-one (0.1 g.) in 1 ml. of pyridine and 0.5 ml. of acetic anhydride. Heat the reaction mixture on the steam bath for 10–20 hours. Dilute with water followed by additional dilution with aqueous hydrochloric acid. Filter the resultant precipitate of substantially 17α-methyl-1,4-androstadiene-17β-ol-3-one 17-acetate. Purify by crystallization from aqueous methanol.

B. *17α-methyl-1,5-androstadiene-17β-ol-3-one 17-acetate.*—To a solution of 1 g. of 17α-methyl-1,4-androstadiene-17β-ol-3-one 17-acetate in 15 ml. of dimethylsulfoxide cooled, add 0.5 g. of potassium tertiary-butoxide. Stir for approximately 15 minutes allowing the temperature of the reaction mixture to slowly rise to room temperature. Pour into ice water; extract with methylene chloride; then wash the combined methylene chloride extracts with water. Evaporate the methylene chloride extracts to a residue. Chromatograph the residue over silica gel eluting with hexane containing increasing percentages of ether. Combine the like eluates as determined by ultraviolet evaluation and thin layer chromatography and evaporate to a residue comprising 17α-methyl-1,5-androstadiene-17β-ol-3-one 17 - acetate. Purify by crystallization from acetone-hexane. M.P. 163–166° C.

In the above-described procedure, by changing the reaction time from 15 minutes to 5 hours, there is obtained the 17-alcohol, e.g., 17α-methyl-1,5-androstadiene-17β-ol-3-one.

*Example 3.—1,5-androstadiene-17β-ol-3-one*

Treat 1,4-androstadiene-17β-ol-3-one with potassium tertiary-butoxide in dimethylsulfoxide in the manner described in Example 1. Isolate the resultant product in the manner described to obtain 1,5-androstadiene-17β-ol-3-one.

*Example 4.—1,5-pregnadiene-11β,17α,21-triol-3,20-dione*

A. *17,20;20,21 - bis - methylenedioxy - 1,5 - pregnadiene-11β-ol-3-one.*—In a manner similar to that described in Example 1, except that the reaction is conducted under an atmosphere of nitrogen, treat 17,20;20,21-bis-methylenedioxy-1,4-pregnadiene-11β-ol-3-one with potassium tertiary-butoxide in dimethylsulfoxide. Isolate the resultant product in the described manner to obtain 17,20;20,21 - bis - methylenedioxy - 1,5 - pregnadiene-11β-ol-3-one. Purify by crystallization from acetone followed by chromatography on silica gel eluting with ether-hexane. Combine like fractions based on ultraviolet evaluation followed by crystallization from acetone. M.P. 244–246° C.

In a similar manner, 6α-methyl-17,20;20,21-bis-methylenedioxy-1,4-pregnadiene-11β-ol-3-one, 6α-fluoro-17,20; 20,21 - bis - methylenedioxy - 1,4 - pregnadiene - 11β - ol-3-one, and 9α - fluoro - 16α - methyl - 17,20;20,21 - bis-methylenedioxy-1,4-pregnadiene-11β-ol-3-one are each reacted with potassium tertiary-butoxide in dimethylsulfoxide and their respective resultant products isolated in the above-described manner to yield, respectively, 6-methyl-17,20;20,21 - bis - methylenedioxy - 1,5 - pregnadiene- 11β - ol - 3 - one, 6 - fluoro - 17,20;20,21 - bis - methylenedioxy - 1,5 - pregnadiene - 11β - ol - 3 - one, and 9α-fluoro - 16α - methyl - 17,20;20,21 - bis - methylenedioxy-1,5-pregnadiene-11β-ol-3-one.

B. *1,5 - pregnadiene-11β,17α,21-triol-3,20-dione.*—Dissolve 0.1 g. of 17,20;20,21-bis-methylenedioxy-1,5-pregnadiene-11β-ol-3-one in 12 ml. of 70% aqueous acetic acid. Allow the solution to remain at room temperature for 48 hours; then dilute with water and extract with chloroform. Combine the chloroform extracts and evaporate to a residue comprising 1,5-pregnadiene-11β,17α,21-triol-3,20-dione.

In a similar manner, treat each of the bis-methylenedioxy-1,5-dienes prepared in the second paragraph of Example 4A with 70% aqueous acetic acid to obtain, respectively, 6 - methyl - 1,5 - pregnadiene - 11β,17α,21- triol-3,20-dione, 6-fluoro-1,5-pregnadiene-11β,17α,21-triol-3,20-dione, and 9α-fluoro-16α-methyl-1,5-pregnadiene-11β,17α,21-triol-3,20-dione.

*Example 5.—1,5-pregnadiene-17α,21-diol-3,11,20-trione*

A. *1,5 - pregnadiene - 17α,21 - diol - 3,11,20 - trione 17,21-acetonide.*—In a manner similar to that described in Example 1, allow 1,4-pregnadiene-17α,21-diol-3,11,20-trione 17,21-acetonide to react with solid potassium tertiary-butoxide in dimethylsulfoxide for 30 minutes. Isolate the resultant product in the described manner and purify from acetone-hexane to give 1,5-pregnadiene-17α,21-diol-3,11,20-trione 17,21-acetonide.

B. *1,5 - pregnadiene - 17α,21 - diol - 3,11,20 - trione.*—Dissolve the 1,5-pregnadiene-17α,21-diol-3,11,20-trione 17,21-acetonide prepared in Example 5A in 3 ml. of 90% aqueous acetic acid. Allow the resulting solution to remain at room temperature for approximately 17 hours, then dilute with water. Collect the resulting precipitate of 1,5-pregnadiene-17α,21-diol-3,11,20-trione by filtration. Purify by pouring a methylene chloride solution of the 1,5-pregnadiene-17α,21-diol-3,11,20-trione onto a Florisil column dampened with methylene chloride. Elute first with methylene chloride; then with methylene chloride/acetone mixtures; combine the fractions of methylene chloride together with those methylene chloride/acetone mixtures which by spectroscopic (U.V.) evaluation contain substantially the 3-keto-1,5-diene product. Concentrate the combined fractions in vacuo to a residue comprising 1,5-pregnadiene-17α,21-diol-3,11,20-trione.

*Example 6.—17α-hydroxy-1,5-pregnadiene-3,20-dione*

A. *20 - ethylenedioxy - 1,4 - pregnadiene - 17α - ol - 3-one.*—Reflux a solution of 1 g. of 17α-hydroxy-1-dehydroprogesterone in 50 ml. of anhydrous benzene and 0.23 ml. of ethylene glycol under a Dean-Stark separator for 4 hours in the presence of 10 mg. of p-toluenesulfonic acid. Cool the mixture, then make slightly basic by the addition of 10% sodium hydroxide. Separate the organic layer; wash to neutrality with water; and concentrate in vacuo to a residue comprising 20-ethylenedioxy-1,4-pregnadiene-17α-ol-3-one.

B. *20 - ethylenedioxy - 1,5 - pregnadiene - 17α - ol - 3-one.*—Allow 20-ethylenedioxy-1,4-pregnadiene-17α-ol-3-one to react with potassium tertiary-butoxide in dimethylsulfoxide in the manner described in Example 2; isolate the resultant product in the described manner to give 20-ethylenedioxy-1,5-pregnadiene-17α-ol-3-one.

C. *1,5-pregnadiene-17α-ol-3,20-dione.*—Dissolve 0.1 g. of 20-ethylenedioxy-1,5-pregnadiene-17α-ol-3-one in 12 ml. of 70% aqueous acetic acid. Allow the solution to remain at room temperature for 17 hours; then dilute with water and extract with chloroform. Combine the chloroform extracts and evaporate to a residue comprising 1,5-pregnadiene-17α-ol-3,20-dione.

*Example 7.—1,5-pregnadiene-3,20-dione*

In a manner similar to that described in Example 1, allow 1,4-pregnadiene-3,20-dione to react with potassium tertiary-butoxide in dimethylsulfoxide for 30 minutes. Isolate the resultant product in the described manner and purify by crystallization from acetone-hexane to give 1,5-pregnadiene-3,20-dione.

I claim:

1. The process for preparing a 3-keto-1,5-bis-dehydrosteroid of the androstane and pregnane series which comprises reacting a steroid selected from the group consisting of a 3-keto-1,4-bis-dehydro-androstane and a 3-keto-1,4-bis-dehydro-pregnane with an alkali metal alkoxide in a solvent selected from the group consisting of a di-lower alkylsulfoxide and an N,N-di-lower alkyl alkanoic acid amide.

2. The process for preparing a 3-keto-1,5-bis-dehydrosteroid of the androstane and pregnane series which comprises reacting a steroid selected from the group consisting of a 3-keto-1,4-bis-dehydro-androstane and a 3-keto-1,4-bis-dehydro-pregnane with an alkali metal alkoxide in a solvent selected from the group consisting of a di-lower alkylsulfoxide and an N,N-di-lower alkyl alkanoic acid amide; and isolating the 3-keto-1,5-bis-dehydro-steroid thereby produced.

3. The process for preparing a 3-keto-1,5-bis-dehydrosteroid of the androstane and pregnane series which comprises reacting a steroid selected from the group consisting of a 3-keto-1,4-bis-dehydro-androstane and a 3-keto-1,4-bis-dehydro-pregnane with potassium tertiary-butoxide in dimethylsulfoxide.

4. The process for preparing 17α-methyl-1,5-androstadiene-17β-ol-3-one which comprises reacting 17α-methyl-1,4-androstadiene-17β-ol-3-one with potassium tertiary-butoxide in dimethylsulfoxide.

No references cited.

LEWIS GOTTS, *Primary Examiner.*